(12) United States Patent
Du

(10) Patent No.: US 10,601,821 B2
(45) Date of Patent: Mar. 24, 2020

(54) IDENTITY AUTHENTICATION METHOD AND APPARATUS, TERMINAL AND SERVER

(71) Applicant: Alibaba Group Holding Limited, Grand Cayman (KY)

(72) Inventor: Zhijun Du, Zhejiang (CN)

(73) Assignee: Alibaba Group Holding Limited (KY)

( * ) Notice: Subject to any disclaimer, the term of this patent is extended or adjusted under 35 U.S.C. 154(b) by 29 days.

(21) Appl. No.: 15/448,534

(22) Filed: Mar. 2, 2017

(65) Prior Publication Data

US 2017/0180362 A1 Jun. 22, 2017

Related U.S. Application Data

(63) Continuation of application No. PCT/CN2015/088215, filed on Aug. 27, 2015.

(30) Foreign Application Priority Data

Sep. 3, 2014 (CN) .......................... 2014 1 0446657

(51) Int. Cl.
*H04L 29/06* (2006.01)
*G06F 21/45* (2013.01)
(Continued)

(52) U.S. Cl.
CPC ........ *H04L 63/0861* (2013.01); *G06F 21/305* (2013.01); *G06F 21/32* (2013.01);
(Continued)

(58) Field of Classification Search
CPC ........... G10L 17/24; G10L 17/22; G07C 9/00; G06K 9/00221; G06K 9/00295;
(Continued)

(56) References Cited

U.S. PATENT DOCUMENTS 5,572,261 A * 11/1996 Cooper .................. H04N 17/00
348/512
6,707,933 B1 * 3/2004 Mariani ............. G06K 9/00228
340/5.83
(Continued)

FOREIGN PATENT DOCUMENTS

CN 101075868 11/2007
CN 102385703 3/2012
(Continued)

OTHER PUBLICATIONS

Head Gesture Recognition in Intelligent Interfaces: The Role of Context in Improving Recognition Louis-Philippe Morency and Trevor Darrell (MIT CSAIL) Jan. 29-Feb. 1, 2006, Sydney, Australia pp. 7 (Year: 2006).*

(Continued)

*Primary Examiner* — Jeffrey C Pwu
*Assistant Examiner* — Ali H. Cheema
(74) *Attorney, Agent, or Firm* — Lee & Hayes, P.C.

(57) ABSTRACT

A method, an apparatus, a terminal, and a server for identity authentication are disclosed. The method includes: receiving dynamic face authentication prompt information sent by a server during identity authentication of a user; obtaining gesture recognition information of the dynamic face authentication prompt information by recognizing a facial gesture presented by the user; and sending the gesture recognition information to the server to enable the server to confirm that the identity authentication is successful for the user in response to verifying that the gesture recognition information is consistent with the dynamic face authentication prompt information. Using the embodiments of the present application, a highly secure authentication can be performed on an identity of a user through dynamic face authentication. As compared with existing authentication methods using an authentication password, authentication information will not (Continued)

be stolen by a malicious third party, thus improving the reliability of authentication. Moreover, a user may be recognized as a live user through dynamic face authentication, thereby further improving the accuracy of identity authentication and reducing potential security risks during authentication.

20 Claims, 11 Drawing Sheets

(51) Int. Cl.
    *G06F 21/35*      (2013.01)
    *G06F 21/32*      (2013.01)
    *G06F 21/30*      (2013.01)
    *G06K 9/00*      (2006.01)
    *G10L 17/22*      (2013.01)
    *G06K 9/22*      (2006.01)

(52) U.S. Cl.
    CPC ............. *G06F 21/35* (2013.01); *G06F 21/45* (2013.01); *G06K 9/00241* (2013.01); *G06K 9/00275* (2013.01); *G06K 9/00281* (2013.01); *G06K 9/00288* (2013.01); *G06K 9/00315* (2013.01); *G06K 9/00335* (2013.01); *G10L 17/22* (2013.01); *G06F 21/30* (2013.01); *G06F 2221/2101* (2013.01); *G06F 2221/2103* (2013.01); *G06F 2221/2115* (2013.01); *G06F 2221/2117* (2013.01); *G06K 9/228* (2013.01); *H04L 63/08* (2013.01)

(58) Field of Classification Search
    CPC ........... G06K 9/00241; G06K 9/00275; G06K 9/00281; G06K 9/00288; G06K 9/00315; G06K 9/00335; G08B 13/19647; G06F 3/017; G06F 21/45; G06F 21/35; G06F 21/305; G06F 21/30; G06F 21/32; G06F 2221/2117; G06F 2221/2103; G06F 2221/2101; G06F 2221/2115; H04L 63/08; H04L 63/0861
    USPC ................ 382/116, 104, 103, 118, 195, 224; 340/5.2; 348/207.11; 345/158; 726/7
    See application file for complete search history.

(56) References Cited

U.S. PATENT DOCUMENTS

| | | | | |
|---|---|---|---|---|
| 9,866,820 | B1* | 1/2018 | Agrawal | G06K 9/00281 |
| 9,986,812 | B2* | 6/2018 | Yamanashi | A45D 44/005 |
| 2006/0061598 | A1* | 3/2006 | Mino | G06K 9/00228 345/629 |
| 2007/0183633 | A1* | 8/2007 | Hoffman | G06K 9/00221 382/116 |
| 2008/0267459 | A1* | 10/2008 | Nakada | G09B 19/00 382/118 |
| 2010/0189358 | A1* | 7/2010 | Kaneda | G06K 9/00744 382/195 |
| 2011/0158546 | A1* | 6/2011 | Huang | G06F 3/011 382/224 |
| 2012/0045093 | A1* | 2/2012 | Salminen | G06K 9/00295 382/103 |
| 2012/0230545 | A1* | 9/2012 | Zhang | G06K 9/00221 382/103 |
| 2012/0281885 | A1* | 11/2012 | Syrdal | G10L 17/24 382/116 |
| 2013/0015946 | A1* | 1/2013 | Lau | G07C 9/00 340/5.2 |
| 2013/0239187 | A1 | 9/2013 | Leddy et al. | |
| 2013/0251244 | A1* | 9/2013 | Wei | G06K 9/00281 382/159 |
| 2014/0059673 | A1 | 2/2014 | Azar et al. | |
| 2014/0118257 | A1* | 5/2014 | Baldwin | G06F 3/017 345/158 |
| 2014/0168453 | A1* | 6/2014 | Shoemake | H04N 5/23206 348/207.11 |
| 2014/0270383 | A1* | 9/2014 | Pederson | G08B 13/19647 382/104 |
| 2014/0341444 | A1* | 11/2014 | Hou | G06F 21/32 382/118 |

FOREIGN PATENT DOCUMENTS

| | | | | |
|---|---|---|---|---|
| CN | 103036680 | A | | 4/2013 |
| CN | 103259796 | A | * | 5/2013 |
| CN | 103259796 | A | * | 5/2013 |
| CN | 103259796 | | | 8/2013 |
| CN | 103593598 | A | | 2/2014 |
| CN | 103634120 | A | | 3/2014 |
| CN | 104298909 | | | 1/2015 |
| CN | 104518877 | | | 4/2015 |
| JP | 2000306090 | A | | 11/2000 |
| JP | 2003216955 | A | | 7/2003 |
| JP | 2004110813 | A | | 4/2004 |
| JP | -2007226327 | A | * | 9/2007    G06F 21/20 |
| JP | 2010231350 | A | | 10/2010 |
| JP | 2015102897 | A | * | 11/2013    G06F 3/01 |
| KR | 1020070034327 | A | | 6/2007 |
| KR | 1020070080066 | A | | 11/2007 |
| KR | WO2013100699 | | | 7/2013 |
| WO | WO2007105193 | A1 | | 9/2007 |

OTHER PUBLICATIONS

Human facial neural activities and gesture recognition for machine-interfacing applications M Hamedi, Sh-Hussain Salleh, TS Tan, K Ismail, J Ali, C Dee-Uam, C Pavaganun, PP Yupapin Dec. 15, 2011 pp. 12 (Year: 2011).*
Face and hand gesture recognition for human-computer interaction Hitoshi Hongo, Mitsunori Ohya, Mamoru Yasumoto, Kazuhiko Yamamoto IEEE Conference Sep. 3-7, 2000 pp. 6 (Year: 2000).*
Fast and Reliable Active Appearance Model Search for 3D Face Tracking Fadi Dornaika and J örgen Ahlberg Mar. 10-11, 2003; pp. 10 (Year: 2003).*
Integrated Face and Gait Recognition From Multiple Views G. Shakhnarovich, L. Lee, T. Darrell pp. 8; (Year: 2001).*
Automatic feature extraction for multi-view 3D face recognition by Xiaoguang Lu.*
Automatic Face Segmentation and Facial Landmark Detection in Range Images Mauricio Pamplona Segundo, Luciano Silva, Member, IEEE, Olga Regina Pereira Bellon, Member, IEEE, and Chauã C. Queirolo pp. 12 (Year: 2010).*
Translation of the Office Action from corresponding Chinese patent application No. 2014104466570, dated Jul. 12, 2018, 20 pages.
Translation of the Search Report from corresponding Chinese patent application No. 2014104466570, dated Nov. 13, 2017, 2 pages.
The Extended European Search Report dated Feb. 20, 2018 for European Patent Application No. 15838136.8, 5 pages.
Translation of International Search Report from corresponding PCT application No. PCT/CN2015/088215 dated Nov. 27, 2015, 2 pages.
Translation of Written Opinion from corresponding PCT application No. PCT/CN2015/088215 dated Nov. 27, 2015, 8 pages.
Hirasawa et al, "Development of Face Image Capturing System for Best Appearance—The Improvement of the Face Detection Algorithm", Technical Report of IEICE, vol. 104, No. 449, The Institute of Electionics, Information and Communication Engineers, Japan, Nov. 11, 2004, pp. 61-66.
The Japanese Office Action dated Jun. 4, 2019 for Japanese Patent Application No. 2017-512314, a counter part of U.S. Appl. No. 15/448,534, 6 pages.
The Notice of Allowance from the Korean Intellectual Property Office dated May 8, 2019 for Korean Application No. 2017-7005848, 1 page.
The Extended European Search Report dated Jul. 15, 2019 for European Patent Application No. 19172346.9, 5 pages.

(56) References Cited

OTHER PUBLICATIONS

Hayakawa et al, "Development of the Robot Which Recognizes a Gaze Direction and a Head Movement—Aiming to Realize a Joint Attention", Technical Report of IEICE, vol. 103, No. 455, The Institute of Electronics, Information and Communication Engineers, Japan, Nov. 14, 2003, pp. 31-36.
English Translated copy of the Japanese Office Action dated Sep. 17, 2019, for Japanese Patent No. 2017-512314, a counterpart foreign application of U.S. Appl. No. 15/448,534, 3 pages.

* cited by examiner

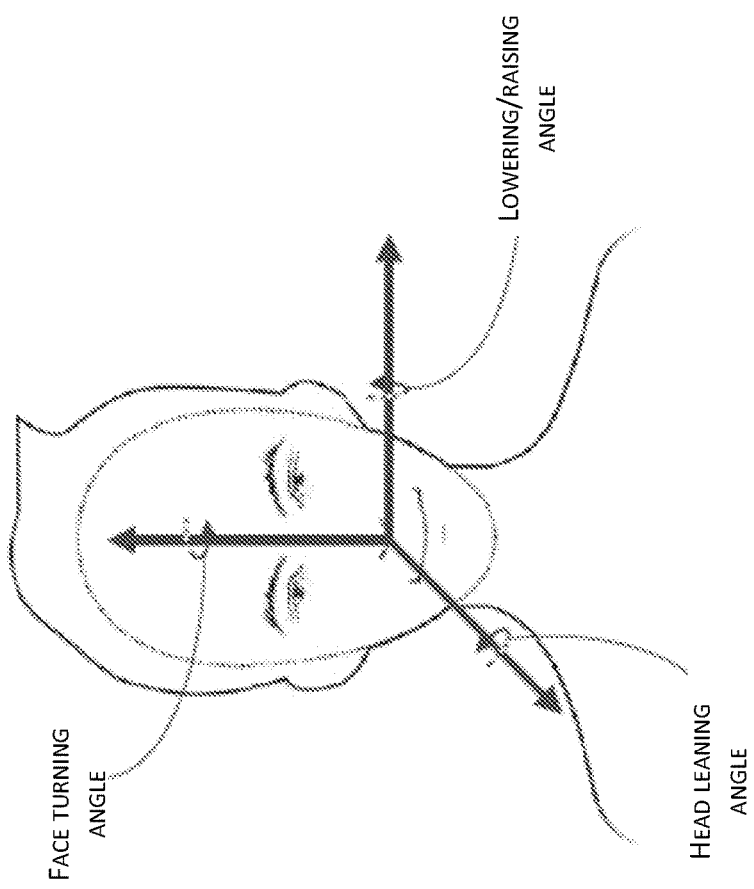

IDENTITY AUTHENTICATION METHOD AND APPARATUS, TERMINAL AND SERVER

CROSS REFERENCE TO RELATED PATENT APPLICATIONS

This application claims priority to and is a continuation of PCT Patent Application No. PCT/CN2015/088215, filed on 27 Aug. 2015, which claims priority to Chinese Patent Application No. 201410446657.0, filed on 3 Sep. 2014, entitled "Identity Authentication Method and Apparatus, Terminal and Server," which are hereby incorporated by reference in their entirety.

TECHNICAL FIELD

The present application relates to the field of communication technologies, and in particular, to identity authentication methods and apparatuses, terminals and servers.

BACKGROUND

With the growth of intelligent terminals and the development of network applications, a user may access various types of network applications, such as social-type instant communication applications and shopping-type applications, through various types of application client terminals that are installed on a terminal. During an access, an identity of a user generally needs to be authenticated, such that the user is allowed to use various application functions after the authentication of the identity is successful.

In existing technologies, a user generally needs to enter an authentication password in an authentication interface during identity authentication, and a server confirms that the user passes the identity authentication upon verifying that the entered authentication password is the same as an authentication password during user registration. However, an authentication password is generally a simple combination of numerals and letters, and is easily stolen by a malicious third party. Therefore, existing methods of identity authentication mode are relatively poor in reliability and are prone to causing user information to be stolen, thus resulting in the poor security of authentication.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present application provides a method, an apparatus, a terminal, and a server for identity authentication, to solve the problems of poor reliability and low security of the identity authentication methods in the existing technologies.

In implementations, an identity authentication method is provided. The method may include receiving dynamic human face authentication prompt information sent by a server when an authentication of an identity of a user is performed; obtaining gesture recognition information of the dynamic human face authentication prompt information by recognizing a facial gesture presented by the user; and sending the gesture recognition information to the server to enable the server to confirm that the authentication of the identity of the user is successful in response to verifying that the gesture recognition information is consistent with the dynamic human face authentication prompt information.

In implementations, another identity authentication method is provided. The method may include sending dynamic human face authentication prompt information to a terminal when an authentication of an identity of a user is performed; receiving gesture recognition information sent by the terminal, the gesture recognition information being gesture recognition information obtained by the terminal through recognizing a facial gesture that is presented by the user according to the dynamic human face authentication prompt information; and determining that the authentication of the identity of the user is successful upon verifying that the gesture recognition information is consistent with the dynamic human face authentication prompt information.

In implementations, an identity authentication apparatus is provided. The apparatus may include a receiving unit configured to receive dynamic human face authentication prompt information sent by a server when an authentication of an identity of a user is performed; a recognition unit configured to obtain gesture recognition information of the dynamic human face authentication prompt information by recognizing a facial gesture that is presented by the user; and a sending unit configured to send the gesture recognition information to the server to enable the server to confirm that the authentication of the identity of the user is successful upon verifying that the gesture recognition information is consistent with the dynamic human face authentication prompt information.

In implementations, another identity authentication apparatus is provided. The apparatus may include a sending unit configured to send dynamic human face authentication prompt information to a terminal when an authentication of an identity of a user is performed; a receiving unit configured to receive gesture recognition information sent by the terminal, the gesture recognition information being gesture recognition information obtained by the terminal through recognizing a facial gesture that is presented by the user according to the dynamic human face authentication prompt information; and a determination unit configured to determine that the authentication of the identity of the user is successful upon verifying that the gesture recognition information is consistent with the dynamic human face authentication prompt information.

In implementations, a terminal is provided, which may include processor(s) and memory configured to store instructions executable by the processor(s), the processor(s) being configured to receive dynamic human face authentication prompt information sent by a server when an authentication of an identity of a user is performed; obtain gesture recognition information of the dynamic human face authentication prompt information by recognizing a facial gesture that is presented by the user; and send the gesture recognition information to the server to enable the server to confirm that the authentication of the identity of the user is successful upon verifying that the gesture recognition information is consistent with the dynamic human face authentication prompt information.

In implementations, a server is provided, which may include processor(s) and memory configured to store instructions executable by the processor(s), the processor(s) being configured to send dynamic human face authentication prompt information to a terminal when an authentication of an identity of a user is performed; receive gesture recognition information sent by the terminal, the gesture recognition information being gesture recognition information obtained by the terminal through recognizing a facial gesture that is presented by the user according to the dynamic human face authentication prompt information; and determine that the authentication of the identity of the user is successful upon verifying that the gesture recognition information is consistent with the dynamic face authentication prompt information.

In implementations, when identity authentication is performed for a user, a server sends dynamic authentication prompt information to a terminal. The terminal obtains gesture recognition information of the dynamic human face authentication prompt information by recognizing a facial gesture that is presented by the user, and sends the gesture recognition information to the server. The server determines that the authentication of the identity of the user is successful upon verifying that the gesture recognition information is consistent with the dynamic human face authentication prompt information. Using the embodiments of the present application, authentication having a high security can be performed on a user identity using dynamic human face authentication. As compared with existing authentication methods that use an authentication password, authentication information will not be stolen by a malicious third party, thus improving the reliability of authentication. Moreover, a user may be recognized as a live user via dynamic human face authentication, thereby further improving the accuracy of identity authentication and reducing potential security risks during a process of authentication.

BRIEF DESCRIPTION OF THE DRAWINGS

FIG. 3B is a schematic diagram of a human head gesture during human face authentication in an embodiment of the present application.

DETAILED DESCRIPTION

Exemplary embodiments will be described herein in detail, and examples thereof are represented in the accompanying drawings. When the following description involves the accompanying drawings, identical numbers in different accompanying drawings represent identical or similar elements, unless specified otherwise. Implementations described in the following exemplary embodiments do not represent all implementations that are consistent with the present application, and are merely examples of apparatuses and methods consistent with some aspects of the present application as described in detail in the appended claims.

Terms used in the present application are merely used for describing specific embodiments rather than limiting the present application. Singular forms "a", "the", and "said" that are used in the present application and the appended claims are also intended to include plural forms, unless the context clearly indicates other meanings. It should further be understood that, the term "and/or" used herein refers to and includes any or all possible combinations of one or more associated items listed.

It should be understood that, although terms such as "first", "second", and "third" may be used to describe various types of information in the present application, those pieces of information are not limited by these terms. These terms are merely used for distinguishing information of the same type from each other. For example, without departing from the scope of the present application, first information may also be referred to as second information, and similarly, second information may alternatively be referred to as first information. Depending on the context, "if" as used herein may be interpreted as "when", "while", or "in response to determining that".

Figure 1:
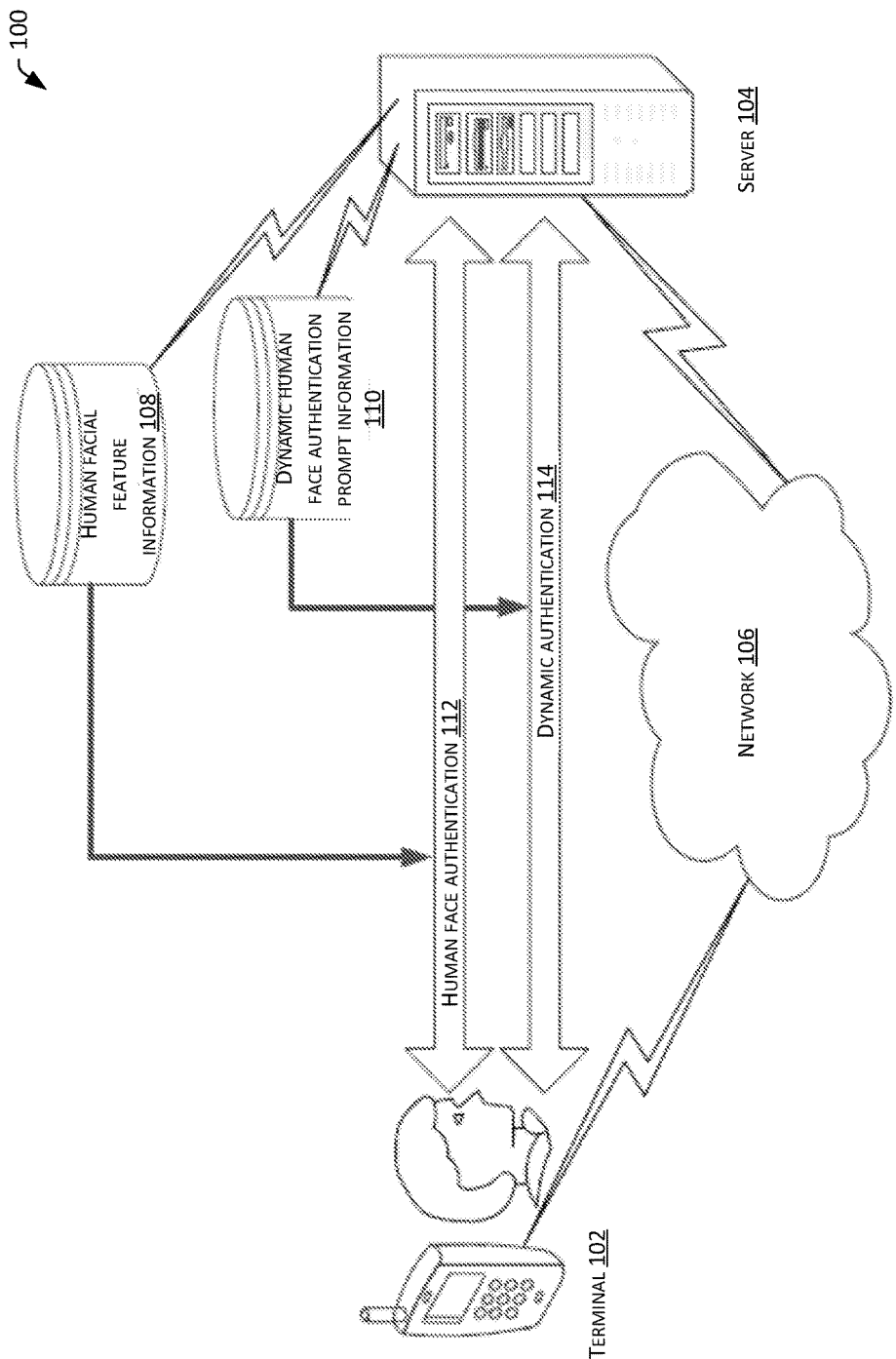
FIG. 1 is a schematic diagram of an identity authentication scenario according to an embodiment of the present application.

In an Internet-based communication scenario, a user may access various types of network applications through various types of application terminals installed on a terminal thereof. During an access process, an identity of the user generally needs to be authenticated. However, in existing technologies, an identity of a user is generally authenticated via an authentication password, and the authentication password is generally a simple combination of numerals and letters, which is easily stolen by a malicious third party. Therefore, existing identity authentication methods are relatively poor in reliability and have a poor security. FIG. 1 shows a schematic diagram of an application scenario 100 for implementing identity authentication according to an embodiment of the present application. Identity authentication of a user is completed through interactions between a terminal 102 held thereby and a server 104. Communications between the terminal 102 and the server 104 may be completed based on a network 106. In implementations, the network 106 may include various types of wireless networks or wired networks, which is not limited in implementations. The terminal 102 may include a mobile phone, a tablet computer, a personal computer, etc. In the application scenario 100 as shown in FIG. 1, two databases may be deployed in the server 104, which are a human facial feature information database 108 and a dynamic human face authentication prompt information database 110 respectively.

In a face registration phase, the terminal 102 may acquire human facial feature information of a registered user, which is sent to the server 104. The server 104 stores the human facial feature information of the registered user into the facial feature information database 108. In an identity authentication phase, human face authentication 112 may be performed first. At this point, a user sends acquired human facial feature information to the server 104. Upon verifying that the human facial feature information matches human facial feature information of the user that is stored in the facial feature information database 108, the server 104 may preliminarily determine that an identity authentication is currently performed on the user himself/herself. Dynamic human face authentication 114 is then performed. At this point, the server 104 may return dynamic human face authentication 114 prompt information acquired from the dynamic human face authentication prompt information database 110 to the user. The terminal 102 recognizes a human facial gesture presented by the user to obtain gesture recognition information of the dynamic human face authentication prompt information, and sends the gesture recognition information to the server 104. Upon verifying that the gesture recognition information is consistent with the dynamic human face authentication prompt information, the server 104 knows that the current user to be authenticated is a live user, thereby finally determining that the identity authentication of the user is successful. For ease of description, in implementations, human facial feature information of a user acquired in the face registration phase is referred to as second human facial feature information, and human facial feature information of the user acquired in the face authentication phase is referred to as first human facial feature information. The embodiments of the present application are described in detail hereinafter.

Figure 2A:
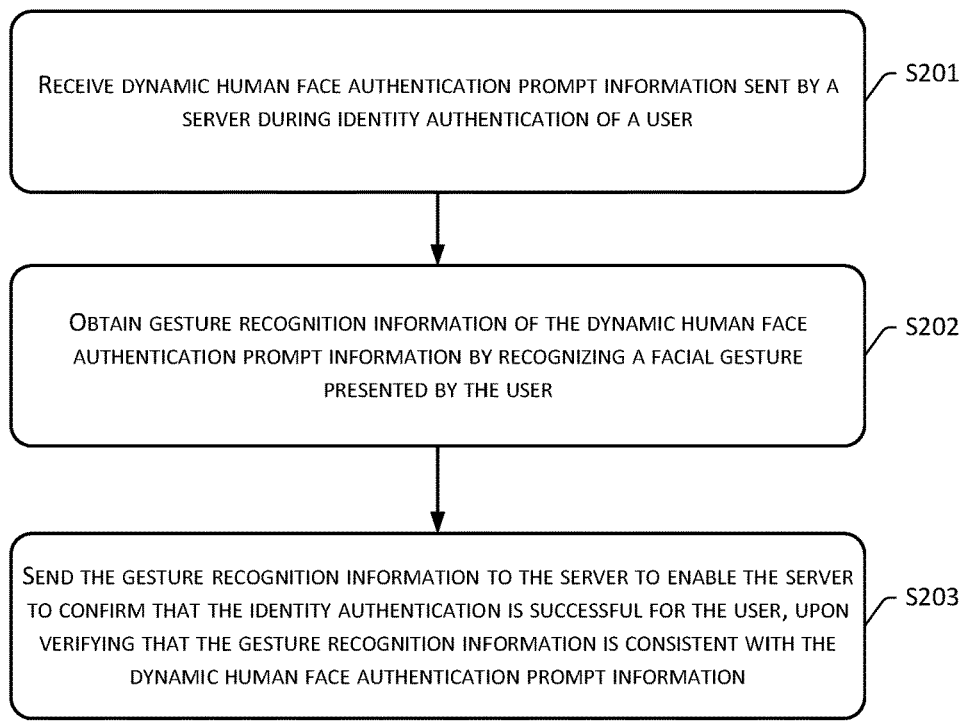
FIG. 2A is a flowchart of an example identity authentication method according to the present application.

FIG. 2A is a flowchart of an example identity authentication method 200 according to the present application. This embodiment is described from the perspective of a terminal that implements an identity authentication.

S201 receives dynamic human face authentication prompt information sent by a server during identity authentication of a user.

In this embodiment of the present application, the server may randomly extract dynamic human face authentication prompt information from dynamic human face authentication prompt information data and returns the dynamic human face authentication prompt information to the terminal. The dynamic human face authentication prompt information may include at least one type of the following information: expression action prompt information, such as closing eye(s), opening a mouth, or turning a head; or voice read prompt information, such as making a payment of 20 dollars.

Optionally, prior to receiving the dynamic human face authentication prompt information from the server, the terminal may first acquire human facial feature information of the user, and use the human facial feature information acquired during the identity authentication as first human facial information of the user. After the first human facial feature information of the user is sent to the server, the server sends the dynamic human face authentication prompt information to the terminal when verifying that the first human facial feature information matches the second facial feature information that is stored.

When acquiring human facial feature information of the user, the terminal may start an imaging device integrated thereon, such as a camera, to detect a human face of the user, and track the human face of the user when the human face is detected. During human face tracking, the terminal acquires human face images according to a preset time interval, determines whether a respective face image fulfills a preset feature extraction condition for each acquired face image, and extracts human facial feature information of the user from that face image if that face image fulfills the feature extraction condition.

After receiving the first human facial feature information of the user, the server may search the facial feature information database based on a user name of the user to obtain second facial feature information corresponding to the user name, and then compares the first human facial feature information and the second human facial feature information using a predefined comparison approach. If a feature comparison value falls within a preset similarity range, a determination may be made that the first human facial feature information matches the second facial feature information. In response to determining that the first human facial feature information matches the second human facial feature information, a determination can be made that human face authentication is successful for the user. In this case, the server sends the dynamic human face authentication prompt information to the terminal.

S202 obtains gesture recognition information of the dynamic human face authentication prompt information by recognizing a facial gesture presented by the user.

In this embodiment of the present application, after receiving the dynamic human face authentication prompt information, the terminal displays the dynamic human face authentication prompt information in an identity authentication interface. The user may present a corresponding human facial gesture according to the information. When recognizing the human facial gesture, the terminal may track the human face of the user to obtain face tracking information. The human face tracking information may include at least one of facial key point position information and human head gesture information. The terminal then obtains gesture recognition information of the user by analyzing the human face tracking information. For example, through the facial key point position information, whether the user closes eye(s) or opens a mouth according to the expression action prompt information may be known, or a mouth shape of the user when reading the voice read prompt information may be known (a correspondence relationship between pronunciation and a mouth shape of each word exists, and gesture recognition information of the user can be determined based on the mouth shape). Furthermore, whether the user turns his/her head, lowers the head, etc., may be known through the head gesture information.

S203 sends the gesture recognition information to the server to enable the server to confirm that the identity authentication is successful for the user, upon verifying that the gesture recognition information is consistent with the dynamic human face authentication prompt information.

The server may need to perform identity authentication for multiple users at one time. If different pieces of dynamic authentication prompt information are sent to different users, the server may record a correspondence relationship between a user name of the user and the dynamic human face authentication prompt information after sending the dynamic human face authentication prompt information to the terminal at S201. At this step, after the terminal sends the gesture recognition information to the server, the server acquires corresponding dynamic human face authentication prompt information according to the user name of the user and verifies that the gesture recognition information is consistent with the dynamic human face authentication prompt information. This indicates that the user is a live user, and in this case, the identity authentication is determined to be successful for the user.

In addition, if the dynamic human face authentication prompt information at S201 is voice read prompt information, the terminal may also obtain audio information of the user in addition to the mouth shape of the user. Through voice recognition of the audio information, voice information read by the user is obtained, such that the server may compare whether the voice information is consistent with the voice read prompt information, and determine that the identity authentication is successful for the user if they are consistent.

Figure 2B:
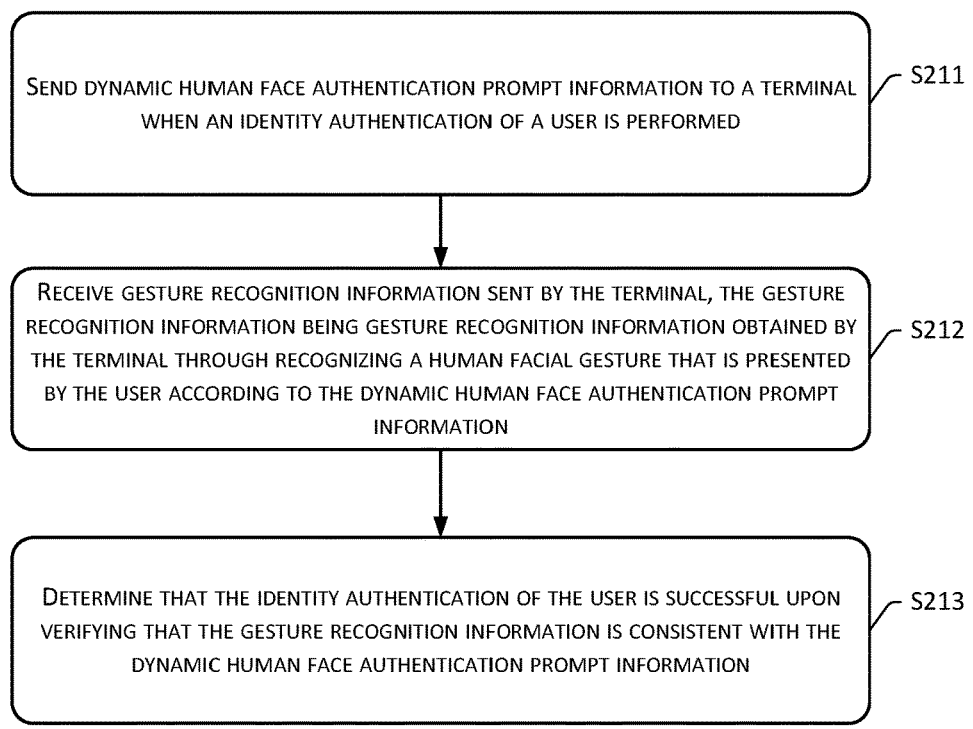
FIG. 2B is a flowchart of another example identity authentication method according to the present application.

FIG. 2B is a flowchart of another example identity authentication method 210 according to the present application.

This embodiment is described from the perspective of a server that implements identity authentication:

S211 sends dynamic human face authentication prompt information to a terminal when an identity authentication of a user is performed.

S212 receives gesture recognition information sent by the terminal, the gesture recognition information being gesture recognition information obtained by the terminal through recognizing a human facial gesture that is presented by the user according to the dynamic human face authentication prompt information.

S213 determines that the identity authentication of the user is successful upon verifying that the gesture recognition information is consistent with the dynamic human face authentication prompt information.

It should be noted that, the only difference between the process of identity authentication as shown in FIG. 2B and the process of identity authentication as shown in FIG. 2A is a difference in entities of execution. Specifically, FIG. 2A is described from the perspective of a terminal, while FIG. 2B is described from the perspective of a server. Therefore, related processes of implementations in the embodiment of FIG. 2B may be referenced to the above description of FIG. 2A, and are not repeatedly described herein.

As can be seen from the foregoing embodiment, this embodiment can perform user identity authentication having a high security by means of dynamic human face authentication. Compared with existing authentication methods using an authentication password, authentication information will not be stolen by a malicious third party, thus improving the reliability of authentication. Moreover, a user may be recognized as a live user via dynamic human face authentication, thereby further improving the accuracy of identity authentication and reducing potential security risks during authentication.

Figure 3A:
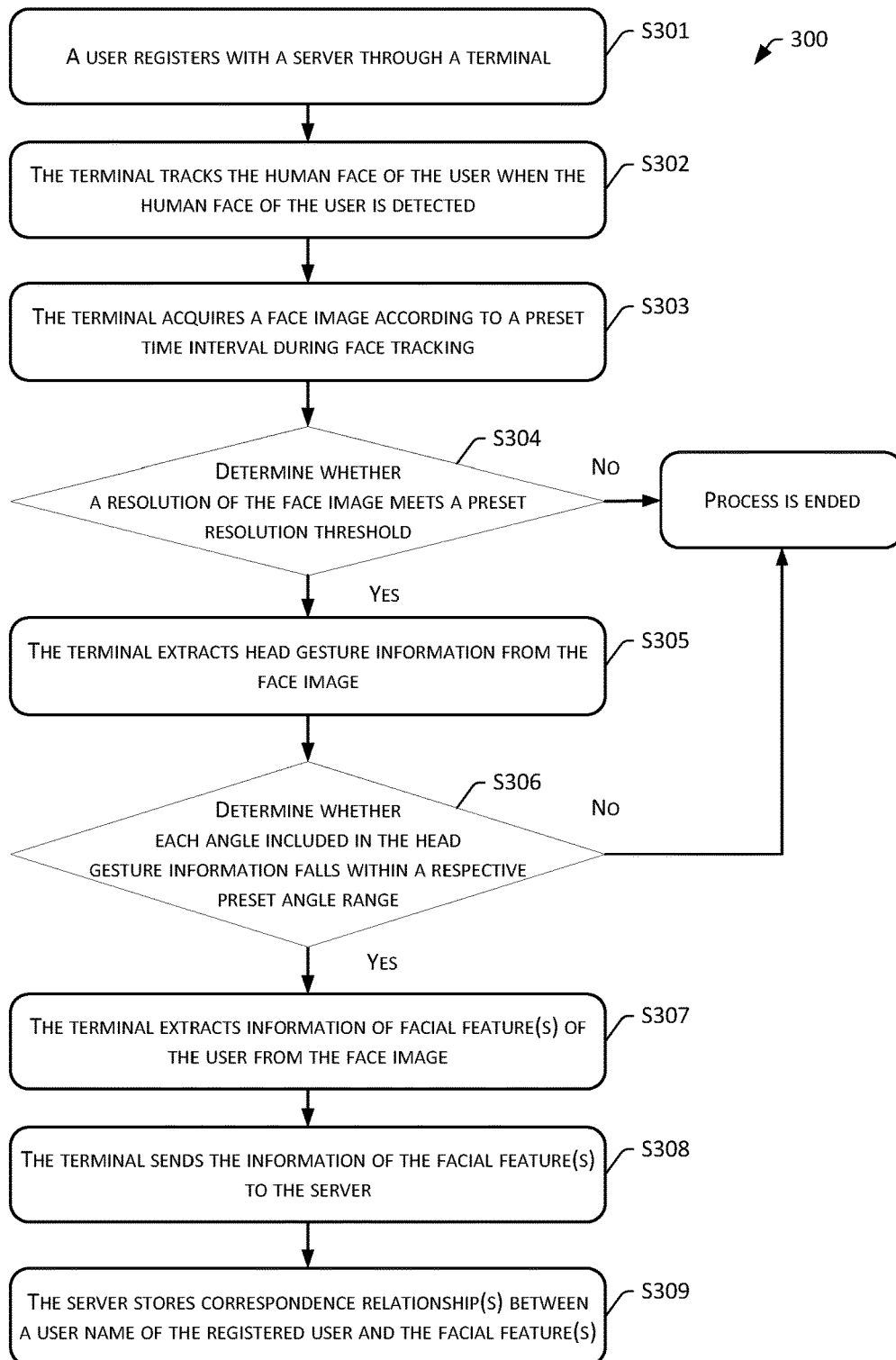
FIG. 3A is a flowchart of another example identity authentication method according to the present application.

FIG. 3A is another example identity authentication method 300 according to the present application. This embodiment illustrates a process of human face registration in detail.

S301: A user registers with a server through a terminal.

S302: The terminal tracks the human face of the user when the human face of the user is detected.

Generally, an imaging device, such as a camera, is integrated in the terminal. In this embodiment, the imaging device may be set to automatically start to detect a human face of the user by default during user registration. Generally, the user may hold the terminal with a hand to align the imaging device with the face of the user. When the face is detected through the imaging device, the terminal may track the face of the user according to a human face tracking algorithm. It should be noted that this embodiment of the present application may employ various types of existing face tracking algorithms, which are not described in detail herein.

S303: The terminal acquires a face image according to a preset time interval during face tracking.

During face tracking, the terminal acquires face images according to a preset time interval using the imaging device. The time interval is set to avoid extraction of face images that are substantially the same. For example, the preset time interval may be 3 seconds.

S304: A determination is made as to whether a resolution of the face image meets a preset resolution threshold. If affirmative, S305 is performed. Otherwise, the current process is ended.

A resolution of the face image acquired at S303 may be examined first to eliminate face image(s) having insufficient resolution. In this case, the terminal may invoke a preset fuzzy determination function to determine whether the resolution of the face image meets the resolution threshold. A fuzzy determination function in an existing image recognition processing technology may be used for this fuzzy determination function, which is not limited in this embodiment of the present application. For a face image satisfying the resolution threshold, S305 is performed. A face image that does not satisfy the resolution threshold is directly discarded, and S303 is then returned.

S305: The terminal extracts head gesture information from the face image.

After determining that the acquired face image is a clear face image at S304, the terminal extracts head gesture information from the face image. FIG. 3B shows a schematic diagram of a head gesture in an embodiment of the present application. The head gesture information in this embodiment may include at least one of the following angles: a head lowering/raising angle, a face turning angle, and a head leaning angle.

S306: The terminal determines whether each angle included in the head gesture information falls within a respective preset angle range. If yes, S307 is performed. Otherwise, the current process is ended.

In this embodiment of the present application, a determination may be made as to whether the face image is a front face image of the user through the head gesture information. At this point, the terminal may determine whether each angle included in the head gesture information falls within a respective preset angle range. For example, a preset angle range is 0 to 10 degrees. For a face image corresponding to head gesture information of which a determination result is positive, S307 is performed. A face image corresponding to head gesture information of which a determination result is negative is directly discarded, and S303 is then returned.

S307: The terminal extracts information of facial feature(s) of the user from the face image.

In this embodiment of the present application, a Linear Back Projection (LBP) feature extraction algorithm may be employed to extract facial feature vector value(s) from the face image as the information of the facial feature(s) of the user. Apparently, this embodiment of the present application does not impose any limitations on a specific algorithm for facial feature extraction. Any facial feature extraction algorithm used in any existing image processing technology may be applicable to this embodiment of the present application, such as a Gabor feature extraction algorithm in windowed Fourier transform, etc.

To guarantee the accuracy of face authentication in the subsequent phase of identity authentication, facial feature information of a user may be extracted from multiple face images for this same registered user during the phase of face registration. The number of face images may be preset, five, for example. Correspondingly, according to the set number of face images, the foregoing S303 to S307 may be performed repeatedly to obtain a number of face images that meets the preset number, and to extract facial feature information therefrom.

S308: The terminal sends the information of the facial feature(s) to the server.

S309: The server stores correspondence relationship(s) between a user name of the registered user and the facial feature(s), and the current process is ended.

In this embodiment, after receiving the information of the facial feature(s) from the terminal, the server may store the correspondence relationship(s) between the user name of the registered user and the facial feature(s) in the facial feature information database, and store correspondence relationships between the user name and information of multiple facial features upon receiving the information of the multiple facial features.

Figure 4A:
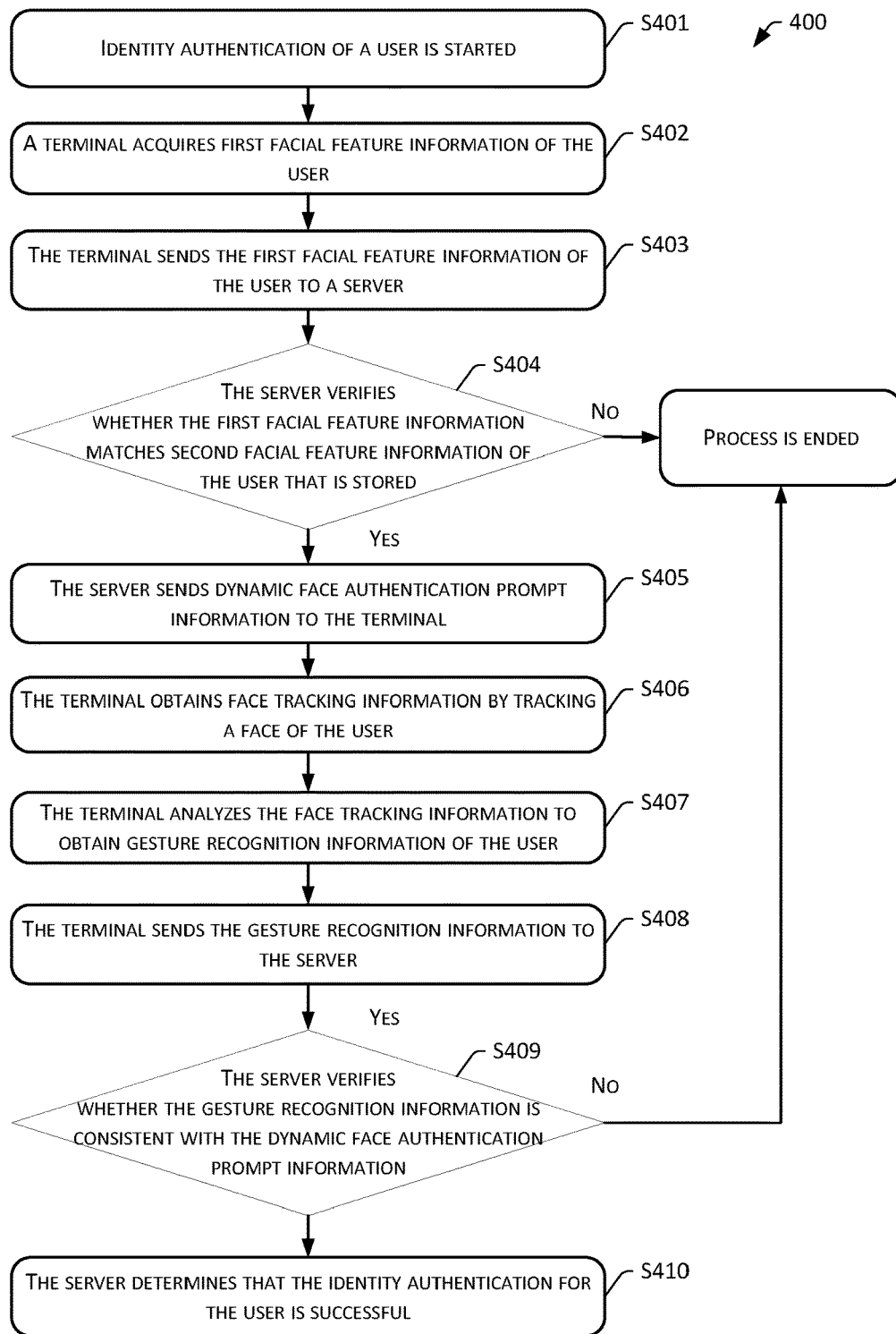
FIG. 4A is a flowchart of another example identity authentication method according to the present application.

FIG. 4A is another example identity authentication method 400 according to the present application. This embodiment describes a process of authenticating an identity of a user in detail, based on the process of face registration as shown in FIG. 3.

S401: Identity authentication of a user is started.

S402: A terminal acquires first facial feature information of the user.

During identity authentication, the terminal acquires the facial feature information of the user using an approach that is the same as that of acquiring facial feature information in the process of face registration as shown in FIG. 3 above, and is specifically the same as S302 to S307 as shown in FIG. 3. Details thereof are not repeatedly described herein.

At this step, the terminal may acquire at least one piece of first facial feature information.

S403: The terminal sends the first facial feature information of the user to a server.

S404: The server verifies whether the first facial feature information matches second facial feature information of the user that is stored. If affirmative, S405 is performed. Otherwise, the current process is ended.

In this embodiment of the present application, after receiving the first facial feature information of the user, the server may search the facial feature information database based on a user name of the user to obtain second facial feature information corresponding to the user name, and then compare the first facial feature information and the second facial feature information in a preset comparison manner. If a feature comparison value falls within a preset similarity range, a determination can be made that the first facial feature information matches the second facial feature information.

The facial feature information in this embodiment of the present application is said to be a facial feature vector extracted via the LBP algorithm as an example.

In one instance, a comparison of Euclidean distances may be used for comparing the first facial feature information and the second facial feature. In this case, a sum of squares of a difference between a second facial feature vector and a first facial feature vector is calculated. If the sum of squares is less than a preset threshold, a determination can be made that the identity authentication is performed on the user himself/herself.

In another instance, a comparison of cosine distances may be used for comparing the first facial feature information and the second facial feature. If a first facial feature vector is V1 and a second facial feature vector is V2, the following formula value may be calculated: V2*V1/(|V1|*|V2|). If the formula value is greater than a preset threshold, a determination can be made that the identity authentication is performed on the user himself/herself.

S405: The server sends dynamic face authentication prompt information to the terminal.

In response to verifying that the first facial feature information matches the second facial feature information, the server confirms that the identity authentication is performed on the user himself/herself, and starts to perform a process of dynamic face authentication at this point. The server may randomly extract a piece of dynamic face authentication prompt information from the dynamic face authentication prompt information database.

In this embodiment, the dynamic face authentication prompt information may include expression action prompt information or voice read prompt information. An action prompted by expression action prompt information is generally an action that a user can easily present through a facial gesture, for example, opening a mouth, closing eye(s), turning a head, etc. For voice read prompt information, the information is generally short, such that the user can easily read it aloud during authentication, and the terminal can easily recognize a facial gesture of the user when the user reads it out.

S406: The terminal obtains face tracking information by tracking a face of the user.

After receiving the dynamic face authentication prompt information, the terminal may output the dynamic face authentication prompt information on an authentication interface. The user may present a corresponding facial gesture according to the information. During presentation, the terminal acquires face tracking information of the user through a face tracking algorithm. The face tracking information may include at least one type of the following information: facial key point position information and head gesture information.

S407: The terminal analyzes the face tracking information to obtain gesture recognition information of the user.

Figure 4B:
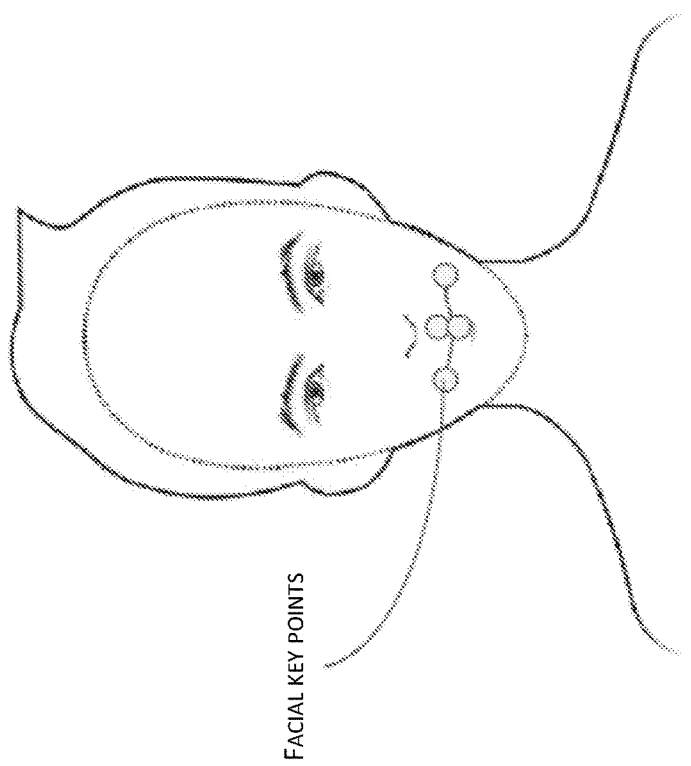
FIG. 4B and FIG. 4C are schematic diagrams of facial key points in an embodiment of the present application.
Figure 4C:
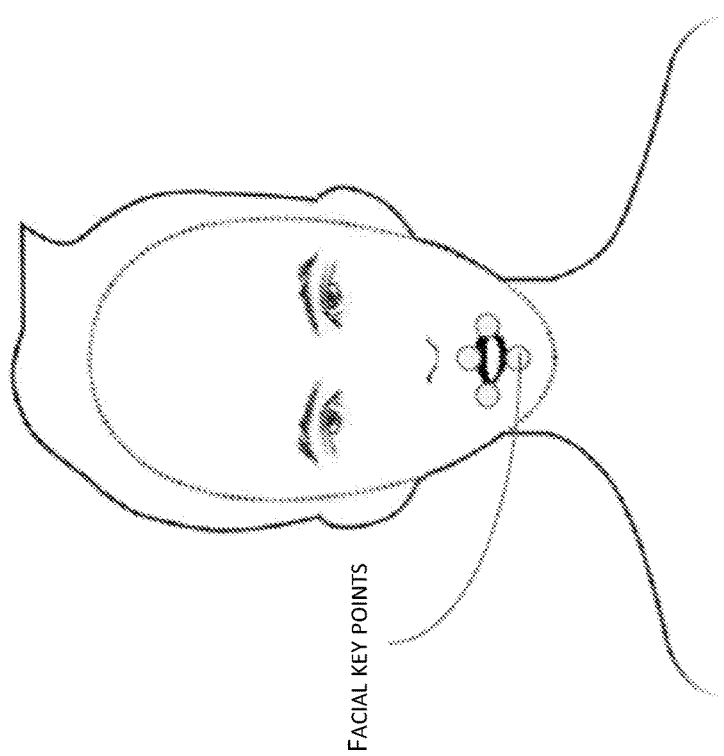

For example, if the dynamic face authentication prompt information is "open a mouth", the user correspondingly makes an action of opening the mouth. The terminal may obtain facial key point position information, which is specifically key point position information of the mouth, by tracking the face of the user. FIG. 4B and FIG. 4C are schematic diagrams of facial key point position information in this embodiment of the present application. FIG. 4B shows extracted information of key point position(s) of a mouth of a user in a normal state. FIG. 4C shows extracted information of key point position(s) of the mouth of the user after the user presents a gesture of opening the mouth. By comparing respective extracted information of the key point position(s) in FIG. 4B and FIG. 4C, i.e., by comparing respective coordinate distances between upper and lower key point positions of the mouth, gesture recognition information of the user can be obtained as "open a mouth".

In another example, if the dynamic face authentication prompt information is "turn a head", the user correspondingly makes an action of turning the head. The terminal may obtain head gesture information, which specifically may include three angles as shown in FIG. 3B, by tracking the face of the user. If angular values of the three angles meet respective angle value ranges defined by "turn a head", gesture recognition information of the user can be obtained as "turn the head".

S408: The terminal sends the gesture recognition information to the server.

S409: The server verifies whether the gesture recognition information is consistent with the dynamic face authentication prompt information. If affirmative, S410 is executed. Otherwise, the current process is ended.

S410: The server determines that the identity authentication for the user is successful, and the current process is ended.

As can be seen from the above embodiment, this embodiment combines face authentication with dynamic authentication to perform a highly secure authentication for an identity of a user, and can preliminarily verify whether it is the user himself/herself via the face authentication. Compared with existing authentication methods using an authentication password, authentication information is not easily stolen by a malicious third party, thus improving the reliability of authentication. Moreover, after the user is confirmed, the user can be recognized as a live user through the dynamic face authentication, thereby further improving the accuracy of identity authentication and reducing potential security risks during authentication.

Corresponding to the embodiments of the identity authentication methods in the present application, the present application further provides embodiments of an apparatus, a terminal, and a server for identity authentication.

Figure 5:
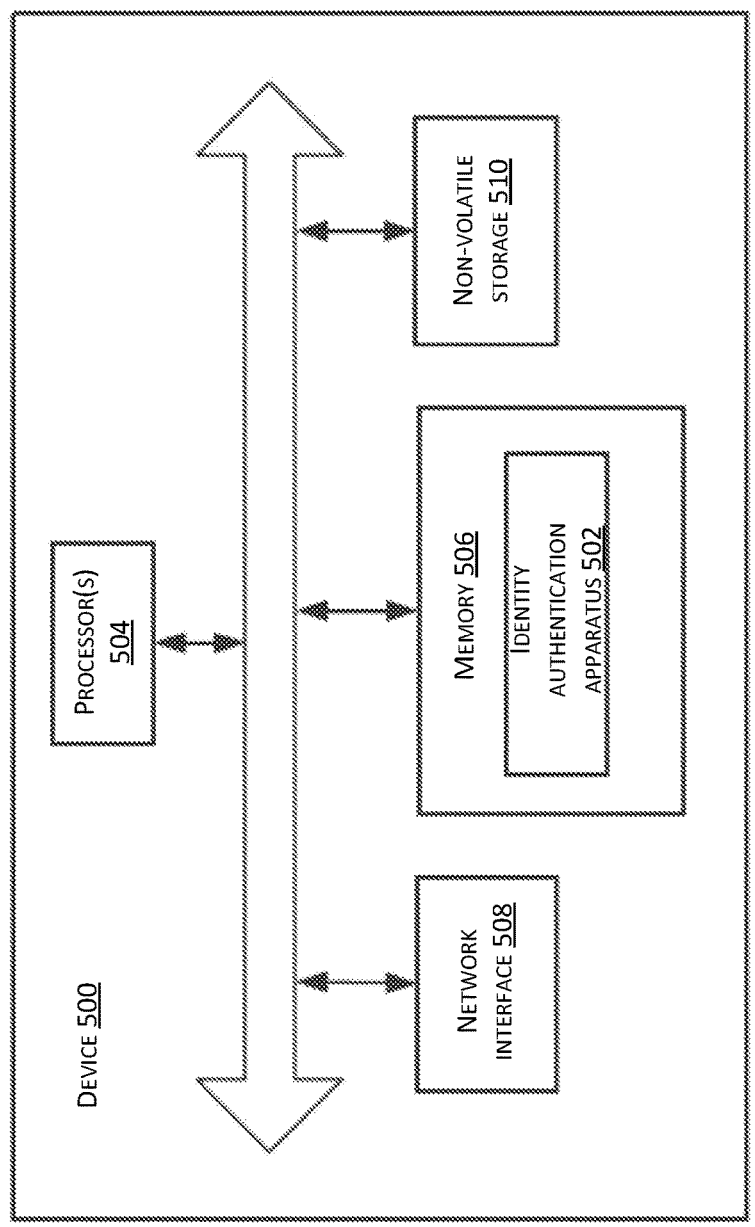
FIG. 5 is a structural diagram illustrating hardware of a device where an identity authentication apparatus according to the present application is located.

An embodiment of an identity authentication apparatus in the present application may be individually applied to a terminal and a server. An apparatus embodiment may be implemented by software, or may be implemented by hardware or a combination of software and hardware. A software implementation is used as an example. As a logical apparatus, the apparatus is formed by processor(s) of a device in which the apparatus is located to read corresponding computer program instructions from a non-volatile storage into memory for running. FIG. 5 shows a hardware structural diagram of a device 500 where an example identity authentication apparatus 502 is located according to the present application from the perspective of hardware level. In addition to processor(s) 504, memory 506, a network interface 508, and a non-volatile storage 510 as shown in FIG. 5, the device 500 where the apparatus 502 is located may generally include other additional hardware components according to actual functions of the device. For example, a terminal may include a camera, a touch screen, a communication component, etc. A server may include a forward chip responsible for processing packets, etc.

The memory 506 may include a form of computer-readable media, e.g., a non-permanent storage device, random-access memory (RAM) and/or a nonvolatile internal storage, such as read-only memory (ROM) or flash RAM. The memory 506 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

Figure 6:
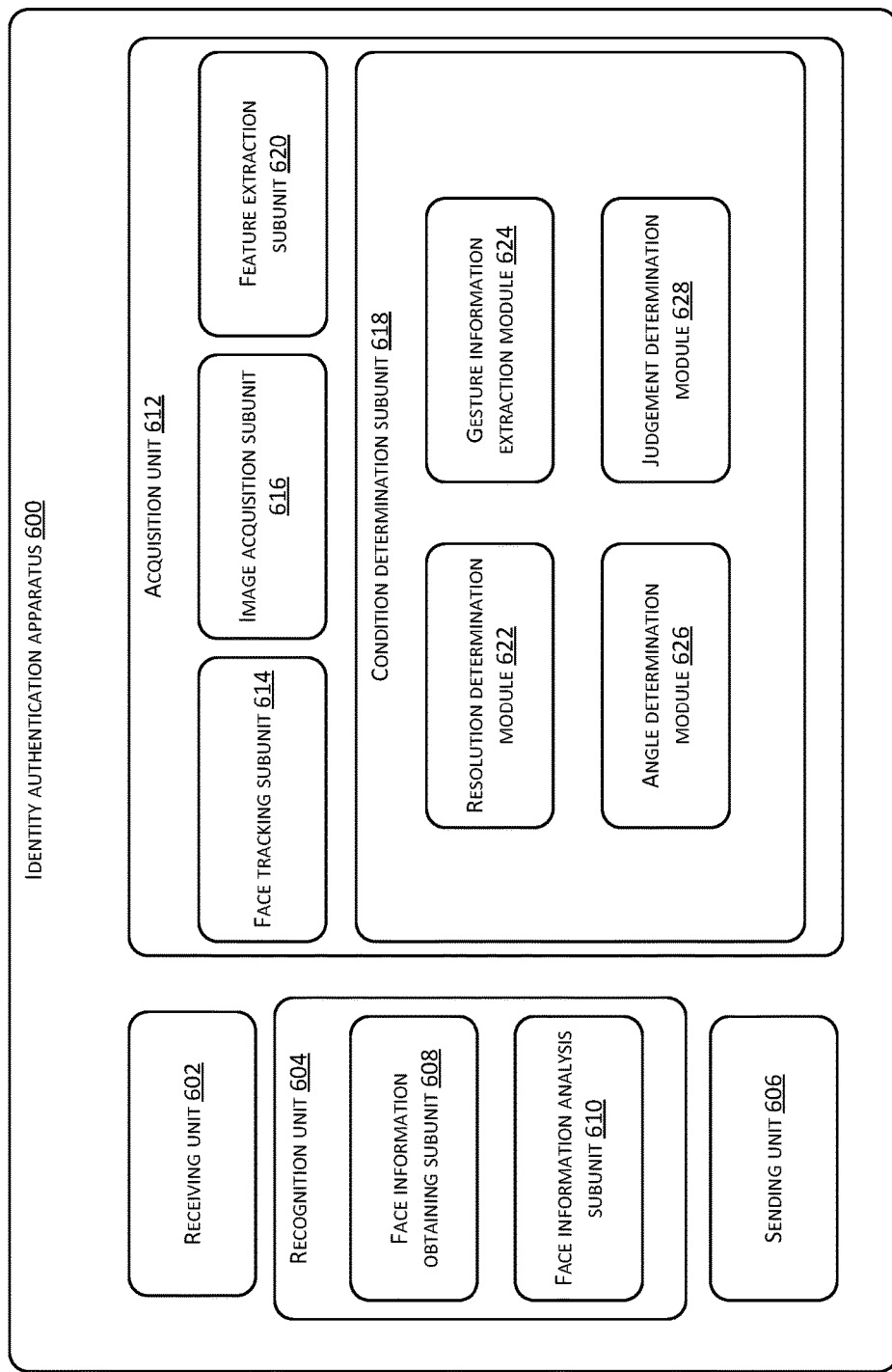
FIG. 6 is a block diagram of an example identity authentication apparatus according to the present application.

FIG. 6 shows a block diagram of an example identity authentication apparatus 600 according to the present application. In implementations, the identity authentication apparatus 600 may be applied on a terminal. In implementations, the apparatus 600 may include a receiving unit 602, a recognition unit 604, and a sending unit 606.

The receiving unit 602 is configured to receive dynamic face authentication prompt information sent by a server during an identity authentication of a user.

The recognition unit 604 is configured to obtain gesture recognition information of the dynamic face authentication prompt information by recognizing a facial gesture presented by the user.

The sending unit 606 is configured to send the gesture recognition information to the server to enable the server to confirm that the identity authentication of the user is successful upon verifying that the gesture recognition information is consistent with the dynamic face authentication prompt information.

In implementations, the recognition unit 604 may include:
a face information obtaining subunit 608 configured to obtain face tracking information by tracking a face of the user when the user presents a facial gesture according to the dynamic face authentication prompt information; and
a face information analysis subunit 610 configured to analyze the face tracking information to obtain gesture recognition information of the user.

In implementations, the face information analysis subunit 610 may obtain expression gesture recognition information of the user by analyzing facial key point position information when the face tracking information is the facial key point position information, or obtain head turning recognition information of the user by analyzing head gesture information when the face tracking information is the head gesture information.

The dynamic face authentication prompt information may include at least one type of the following information: expression action prompt information, or voice read prompt information.

In implementations, the apparatus 600 may further include an acquisition unit 612 configured to acquire facial feature information of the user, and use the facial feature information acquired during the identity authentication as first facial feature information of the user.

In implementations, the sending unit 606 may further send the first facial feature information of the user to the server to enable the server to send the dynamic face authentication prompt information upon verifying that the first facial feature information matches second facial feature information of the user that is stored.

In implementations, the acquisition unit 612 may further acquire facial feature information of the user when the user conducts registration, and use the facial feature information acquired during the registration as the second facial feature information of the user. The sending unit 606 may further send the second facial feature information to the server to allow the server to store a correspondence relationship between a user name of the user and the second facial feature.

In implementations, the acquisition unit 612 may include a face tracking subunit 614 configured to track the face of the user when the face of the user is detected; an image acquisition subunit 616 configured to acquire a face image according to a preset time interval during face tracking; a condition determination subunit 618 configured to determine whether the face image meets a preset feature extraction condition; and a feature extraction subunit 620 configured to extract facial feature information of the user from the face image in an event that the feature extraction condition is met.

In implementations, the condition determination subunit 618 may further include a resolution determination module 622 configured to determine whether a resolution of the face image meets a preset resolution threshold; a gesture information extraction module 624 configured to extract head gesture information from the face image if the resolution threshold is met, the head gesture information including at least one of the following angles: a head lowering/raising angle, a face turning angle, or a head leaning angle; an angle determination module 626 configured to determine whether each angle included in the head gesture information falls within a respective preset angle range; and a judgment determination module 628 configured to determine that the face image meets the feature extraction condition if each angle falls within the respective preset angle range.

In implementations, the feature extraction subunit 620 may extract a facial feature vector value from the face image as the facial feature information of the user using a preset feature extraction algorithm, wherein the preset feature extraction algorithm may include a Linear Back Projection (LBP) feature extraction algorithm, or a Gabor feature extraction algorithm in windowed Fourier transform.

Figure 7:
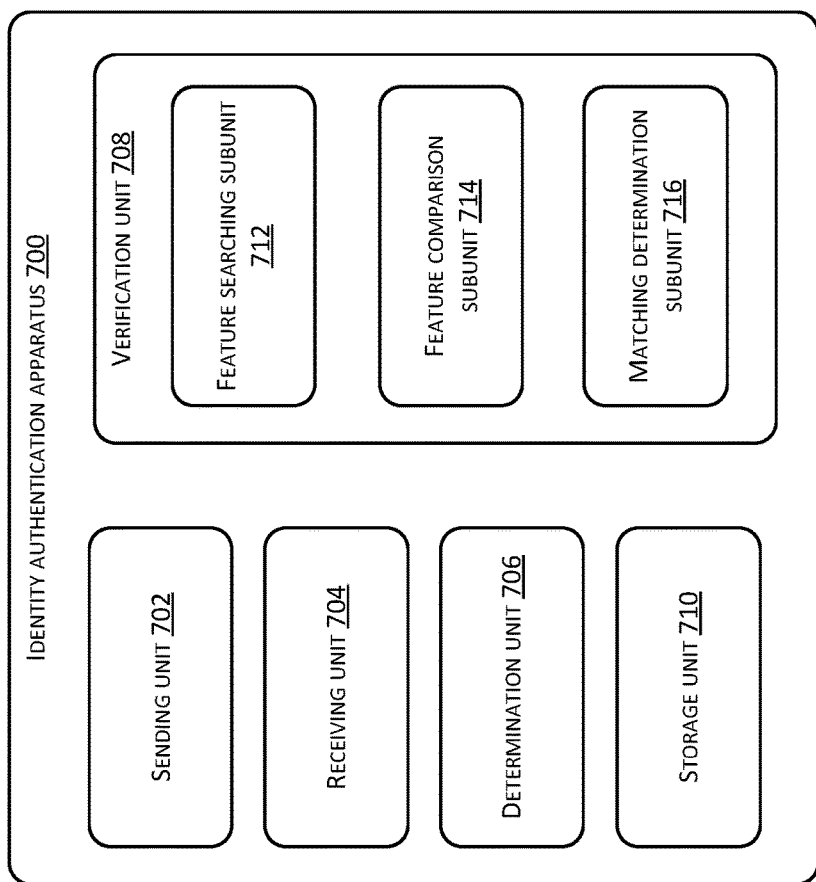
FIG. 7 is a block diagram of another example identity authentication apparatus according to the present application.

FIG. 7 shows a block diagram of another example identity authentication apparatus 700 according to the present application. The identity authentication apparatus 700 may be applied on a server. In implementations, the apparatus may include a sending unit 702, a receiving unit 704, and a determination unit 706.

The sending unit 702 is configured to send dynamic face authentication prompt information to a terminal during identity authentication of a user.

The receiving unit 704 is configured to receive gesture recognition information sent by the terminal, the gesture recognition information being gesture recognition information obtained by the terminal through recognizing a facial gesture that is presented by the user according to the dynamic face authentication prompt information.

The determination unit 706 is configured to determine that the identity authentication of the user is successful in response to verifying that the gesture recognition information is consistent with the dynamic face authentication prompt information.

In implementations, the receiving unit 704 may further receive first facial feature information of the user sent by the terminal.

In implementations, the apparatus 700 may further include a verification unit 708 configured to verify whether the first facial feature information matches second facial feature information of the user that is stored. The sending unit 702 may send the dynamic face authentication prompt information to the terminal in response to a match therebetween.

In implementations, the receiving unit 704 may further receive the second facial feature information of the user sent by the terminal when the user conducts a registration. In implementations, the apparatus 700 may further include a storage unit 710 configured to store a correspondence relationship between a user name of the user and the second facial feature information.

Optionally, the verification unit 708 may include a feature searching subunit 712 configured to search for the correspondence relationship based on the user name of the user to obtain the second facial feature information corresponding to the user name; a feature comparison subunit 714 configured to compare the first facial feature information and the second facial feature information in a preset comparison manner; and a matching determination subunit 716 configured to determine that the first facial feature information matches the second facial feature information if a feature comparison value falls within a preset similarity range. The preset comparison manner used by the feature comparison subunit 714 may include a method of Euclidean distance comparison, or a method of cosine distance comparison.

Details of processes of implementations of functions and effects of the various units in the foregoing apparatuses may be referenced to the processes of implementations of the corresponding steps in the foregoing methods, and are not repeatedly described herein.

Since the apparatus embodiments basically correspond to the method embodiments, related parts may be referenced to respective parts of the description of the method embodiments. The apparatus embodiments described above are merely exemplary. The units that are described as individual components may or may not be physically separate. A component displayed as a unit may or may not be a physical unit, i.e., may be located at a single place, or distributed among multiple network units. Some or all of the modules may be selected according to a real requirement to achieve the objective of the solutions of the present application. One of ordinary skill in the art can understand and implement the present application without making any creative effort.

As can be seen from the foregoing embodiments, a highly secure authentication can be performed on an identity of a user through dynamic face authentication during identity authentication of the user. As compared with existing authentication methods using an authentication password, authentication information will not be easily stolen by a malicious third party, thus improving the reliability of authentication. Moreover, a user can be recognized as a live user through the dynamic face authentication, thereby further improving the accuracy of identity authentication and reducing potential security risks during authentication.

One skilled in the art can easily come up with other implementation solutions of the present application after considering the specification and practicing the invention disclosed herein. The present application is intended to cover any variations, usages, or adaptive changes of the present application. These variations, usages or adaptive changes follow general principles of the present application and include common knowledge or conventional technical measures in the present technical field that are not disclosed in the present application. The specification and embodiments are merely considered as exemplary, and the real scope and spirit of the present application are specified by the claims herein.

It should be noted that the present application is not limited to the precise structures that have been described above and illustrated in the accompanying drawings. Various modifications and changes can be made to the present application without departing from the scope thereof. The scope of the present application is only limited by the appended claims.

What is claimed is:

1. An identity authentication method comprising:
   acquiring facial feature information of a user, the acquiring the facial feature information of the user including:
   tracking a face of the user upon detecting the face of the user;
   acquiring multiple face images, a time interval between acquiring a first face image of the multiple face images and acquiring a second image of the multiple face images being more than a preset time interval to avoid extraction of a same face image;
   determining that a resolution of a respective face image of the multiple face images meets a preset resolution threshold;
   extracting head gesture information from the respective face image, the head gesture information including at least one of following angles including a head lowering or raising angle, a face turning angle, or a head leaning angle; and determining whether a respective angle of the angles in the respective face image falls within a preset angle range;

discarding the respective face image in response to determining that the respective angle does not fall within the preset angle range; and extracting the facial feature information of the user from the respective face image in response to determining that the respective angle falls within the preset angle range;

using the facial feature information as first facial feature information of the user;

sending the first facial feature information of the user to a server to allow the server to send dynamic face authentication prompt information that is randomly extracted from multiple dynamic human face authentication prompt information data, in response to verifying that the first facial feature information matches second facial feature information of the user that is stored, the multiple dynamic human face authentication prompt information data including expression action prompt information and voice read prompt information;

receiving the dynamic face authentication prompt information sent by the server;

obtaining gesture recognition information of the dynamic face authentication prompt information by recognizing a facial gesture presented by the user; and sending the gesture recognition information to the server to enable the server to confirm that an identity authentication is successful for the user upon verifying that the gesture recognition information is consistent with the dynamic face authentication prompt information.

2. The method of claim 1, further comprising:
acquiring the facial feature information of the user during a user registration;
using the facial feature information acquired during the registration as the second facial feature information of the user; and
sending the second facial feature information to the server to enable the server to store a correspondence relationship between a user name of the user and the second facial feature information.

3. The method of claim 1, wherein the extracting the facial feature information of the user from the respective face image in response to determining that the respective angle falls within the preset angle range comprises:
determining that the respective face image meets a feature extraction condition when each angle falls within the preset angle range.

4. The method of claim 1, wherein the obtaining the gesture recognition information comprises:
obtaining face tracking information by tracking the face of the user when the user presents a facial gesture according to the dynamic face authentication prompt information; and
analyzing the face tracking information to obtain the gesture recognition information of the user.

5. The method of claim 4, wherein the analyzing the face tracking information to obtain the gesture recognition information of the user comprises:
when the face tracking information is facial key point position information, obtaining expression gesture recognition information of the user by analyzing the facial key point position information; or
when the face tracking information is head gesture information, obtaining head turning recognition information of the user by analyzing the head gesture information.

6. The method of claim 1, wherein the expression action prompt information includes opening a mouth.

7. The method of claim 6, wherein:
the dynamic face authentication prompt information comprises the voice read prompt information; and
the obtaining the gesture recognition information comprises:
obtaining mouth shapes and audio information of the user; and
recognizing one or more mouth shapes of the user when reading the voice read prompt information and obtaining voice information of the user from the audio information through voice recognition,
wherein:
the recognizing the one or more mouth shapes and the obtaining the voice information enable the server to determine whether the voice information is consistent with the voice read prompt information when verifying the gesture recognition information; and
the identity authentication is determined to be successful for the user upon verifying that the voice information is consistent with the voice read prompt information and the gesture recognition information is consistent with the dynamic face authentication prompt information.

8. Memory storing computer-readable instructions, executable by one or more processors, that cause the one or more processors to perform acts comprising:
acquiring multiple face images of a user, a time interval between acquiring a first face image of the multiple face images and acquiring a second image of the multiple face images being more than a preset time interval to avoid extraction of a same face image;
extracting head gesture information from a face image of the multiple face images, the head gesture information including at least one of following angles including a head lowering or raising angle, a face turning angle, or a head leaning angle;
determining whether a respective angle of the angles in the face image falls within a preset angle range;
discarding the face image in response to determining that the respective angle does not fall within the preset angle range; and
extracting facial feature information of the user from the face image in response to determining that the respective angle falls within the preset angle range; and
using the facial feature information as first facial feature information of the user;
sending the first facial feature information of the user to the server to allow the server to send the dynamic face authentication prompt information in response to verifying that the first facial feature information matches second facial feature information of the user that is stored;
receiving dynamic face authentication prompt information sent by a server during identity authentication of the user, the dynamic face authentication prompt information being randomly extracted from multiple dynamic human face authentication prompt information data including expression action prompt information and voice read prompt information;

obtaining gesture recognition information of the dynamic face authentication prompt information by recognizing a facial gesture presented by the user; and sending the gesture recognition information to the server to enable the server to confirm that the identity authentication of the user is successful upon verifying that the gesture recognition information is consistent with the dynamic face authentication prompt information.

9. The memory of claim 8, wherein the obtaining the gesture recognition information comprises:

obtaining face tracking information by tracking the face of the user when the user presents a facial gesture according to the dynamic face authentication prompt information; and analyzing the face tracking information to obtain the gesture recognition information of the user.

10. The memory of claim 9, wherein the analyzing the face tracking information to obtain the gesture recognition information of the user comprises:

obtaining expression gesture recognition information of the user by analyzing facial key point position information when the face tracking information is the facial key point position information; or obtaining head turning recognition information of the user by analyzing head gesture information when the face tracking information is the head gesture information.

11. The memory of claim 8, wherein the acts further comprise:

acquiring facial feature information of the user during a user registration;

using the facial feature information acquired during the registration as the second facial feature information of the user; and sending the second facial feature information to the server to allow the server to store a correspondence relationship between a user name of the user and the second facial feature information.

12. The memory of claim 8, wherein the acquiring the multiple face images comprise:

determining that a resolution of the face image meets a preset resolution threshold;

extracting head gesture information from the face image, the head gesture information comprising at least one of following angles including a head lowering or raising angle, a face turning angle, or a head leaning angle;

determining that each angle of the angles in the face image falls within the preset angle range; and determining that the face image meets a feature extraction condition.

13. The memory of claim 8, wherein the expression action prompt information includes opening a mouth.

14. The memory of claim 8, wherein the expression action prompt information comprises closing one or more eyes.

15. A terminal comprising:

one or more processors; and memory storing computer-readable instructions, executable by the one or more processors, that cause the one or more processors to perform acts comprising:

acquiring multiple face images of a user, a time interval between acquiring a first face image of the multiple face images and acquiring a second image of the multiple face images being more than a preset time interval to avoid extraction of a same face image;

extracting head gesture information from a face image of the multiple face images, the head gesture information including at least one of following angles including a head lowering or raising angle, a face turning angle, or a head leaning angle;

determining whether a respective angle of the angles in the face image falls within a preset angle range;

discarding the face image in response to determining that the respective angle does not fall within the preset angle range; and extracting facial feature information of the user from the face image in response to determining that the respective angle falls within the preset angle range;

using the facial feature information as first facial feature information of the user;

sending the first facial feature information of the user to a server to allow the server to send dynamic face authentication prompt information in response to verifying that the first facial feature information matches second facial feature information of the user that is stored;

receiving dynamic face authentication prompt information sent by the server;

obtaining gesture recognition information of the dynamic face authentication prompt information by recognizing a facial gesture presented by the user, the recognizing the facial gesture including comparing a respective coordinate distance between an upper key point position and a lower key point position of a mouth of the user; and sending the gesture recognition information to the server to enable the server to confirm that the user passes the identity authentication upon verifying that the gesture recognition information is consistent with the dynamic face authentication prompt information.

16. The terminal of claim 15, wherein the acquiring the multiple face images comprises:

determining that a resolution of the face image meets a preset resolution threshold;

extracting head gesture information from the face image;

determining that each angle of the angles in the face image included in the head gesture information falls within the preset angle range; and determining that the face image meets a feature extraction condition.

17. The terminal of claim 15, wherein:

the dynamic face authentication prompt information comprises voice read prompt information; and the obtaining the gesture recognition information comprises:

obtaining mouth shapes and audio information of the user; and recognizing one or more mouth shapes of the user when reading the voice read prompt information and obtaining voice information of the user from the audio information through voice recognition, wherein:

the recognizing the one or more mouth shapes and the obtaining the voice information enable the server to determine whether the voice information is consistent with the voice read prompt information when verifying the gesture recognition information; and the identity authentication is determined to be successful for the user upon verifying that the voice information is consistent with the voice read prompt information and the gesture recognition information is consistent with the dynamic face authentication prompt information.

18. The terminal of claim 15, wherein the acts further comprise:

acquiring the facial feature information of the user during a user registration;

using the facial feature information acquired during the registration as the second facial feature information of the user; and sending the second facial feature information to the server to enable the server to store a correspondence relationship between a user name of the user and the second facial feature information.

19. The terminal of claim 15, wherein the obtaining the gesture recognition information comprises:

obtaining face tracking information by tracking the face of the user when the user presents a facial gesture according to the dynamic face authentication prompt information; and analyzing the face tracking information to obtain the gesture recognition information of the user.

20. The terminal of claim 19, wherein the analyzing the face tracking information to obtain the gesture recognition information of the user comprises:

when the face tracking information is facial key point position information, obtaining expression gesture recognition information of the user by analyzing the facial key point position information; or when the face tracking information is head gesture information, obtaining head turning recognition information of the user by analyzing the head gesture information.

* * * * *